United States Patent [19]

Takaoka et al.

[11] 4,446,331
[45] May 1, 1984

[54] POWER CABLE JOINT STRUCTURE INCLUDING A REINFORCEMENT INSULATOR CONTAINING ELECTRODE SPHERICAL BODIES

[75] Inventors: Michio Takaoka, Chiba; Motoyuki Ono, Sakura; Isao Kaji, Ichikawa; Shigeki Yagi, Yachiyo, all of Japan

[73] Assignee: The Fujikura Cable Works, Limited, Tokyo, Japan

[21] Appl. No.: 396,139

[22] Filed: Jul. 7, 1982

[30] Foreign Application Priority Data

Jul. 17, 1981 [JP] Japan .......................... 56-106944[U]

[51] Int. Cl.³ ................. H02G 15/068; H02G 15/188
[52] U.S. Cl. .............................................. 174/73 R
[58] Field of Search ............. 174/73 R, 73 SC, 84 R, 174/85, 88 C

[56] References Cited

U.S. PATENT DOCUMENTS

| | | | |
|---|---|---|---|
| 3,349,164 | 10/1967 | Wyatt | 174/73 R |
| 3,538,241 | 11/1970 | Rein | 174/73 R X |
| 4,234,439 | 11/1980 | Kehr et al. | 174/73 R X |
| 4,363,842 | 12/1982 | Nelson | 174/73 R X |
| 4,418,240 | 11/1983 | Chazelas | 174/73 R |

FOREIGN PATENT DOCUMENTS

| | | | |
|---|---|---|---|
| 2456410 | 12/1980 | France | 174/73 R |
| 137291 | 8/1979 | German Democratic Rep. | 174/73 R |
| 46-39037 | 11/1971 | Japan | 174/73 R |
| 55-104014 | 8/1980 | Japan | 174/73 R |

Primary Examiner—Laramie E. Askin
Attorney, Agent, or Firm—Frishauf, Holtz, Goodman & Woodward

[57] ABSTRACT

In the joint structure for a power cable, a cable insulator covers a cable conductor. A reinforcement insulator is mounted on the said cable insulator. In the said reinforcement insulator there are disposed by dispersion a plurality of electrode spheres. The voltage applied in between the said cable conductor and a cable shielding layer covering the said cable insulator is borne by the electrostatic capacities occurring among the said electrode spheres.

3 Claims, 17 Drawing Figures

POWER CABLE JOINT STRUCTURE INCLUDING A REINFORCEMENT INSULATOR CONTAINING ELECTRODE SPHERICAL BODIES

BACKGROUND OF THE INVENTION

The invention relates to a joint structure for power cables with an improved intermediate or termination joint section of the condenser type.

A joint structure of power cables has been known for many years. In this structure, an insulating cover layer is formed around the cable conductor and around this insulating cover layer a reinforcement insulating layer of the condenser type is formed by winding thereon insulating tape and conductive tape alternately.

With this structure, however, the insulating tape and conductive tape must be wound by hand, which involves a great deal of labor. Moreover, wrinkles and shiftings tend to occur in the conductive tape, resulting in dielectric breakdown even at low voltage. Another disadvantage is that the electric field is concentrated at the edges of the conductive tape, leading to severe stress in the insulating layer. Examples of joint structures in which such drawbacks have been corrected are Japan Patent Showa 46-39,037 and U.S. Pat. No. 3,538,241.

Japanese Patent Publication 46-39,037 discloses an embodiment of the invention concerning the termination joint section. In this joint structure, a flexible insulating braid is wound in a specific shape around the insulating cover in termination of a cable. Conductive paint is applied on the insulating braid made of rubber or plastic at specific intervals, so that electrodes are formed consisting of conductive layers of a specific width. An insulating cover is formed on the outside of the braid.

In this prior art, however, in order to mitigate the large voltage stress in the vicinity of a cable shielding layer, the intervals of said electrodes are narrowed and hence the electrostatic capacities are increased. In order to reduce the bearing of the voltage among the electrodes, it is necessary to increase the number of said electrodes and also to narrow the intervals of these electrodes. Therefore, both the said braid of rubber or plastic and the insulating cover must be thinned. Producing such thin insulating braids is impractical. Also, it is difficult to wind the braid around the insulating cover in termination of a cable. The said electrodes formed by applying a conductive paint are in cylindrical or planar form, so that there are edges in the respective electrodes which cause steep electric fields in the vicinity. Furthermore, in order to eliminate the voids produced between the braids thus wound and thereby improve the voltage-withstand electrical characteristic, the insulating braids after winding are occasionally molded by heating. This heat molding often causes deformation of the said electrodes and flow of the resin forming the outer insulating cover, resulting in a shift of the arrangement of electrodes and hence change in the distribution of electrostatic capacities. Since the electrodes are formed by applying a conductive paint, when the braid is under tension, disadvantages arise, such as the breaking off of the paint film.

SUMMARY OF THE INVENTION

An object of the invention is to provide joint structure for power cables in which proper distribution of electrostatic capacities and proper bearing of the voltage are enabled by easy regulation of the intervals of electrodes and the size of electrodes, thus eliminating the disadvantages mentioned above.

To achieve this object, the joint structure for power cables according to the present invention comprises cable conductor means, cable insulator means covering the said cable conductor means, cable shielding layer means consisting of conductive tape wound around the said cable conductor means over the said cable insulator means, and reinforcement insulator means mounted over the said insulator means for capacitively controlling the distribution of voltage in between the said cable conductor means and the said cable shielding layer means, plural electrode spherical bodies being disposed by dispersion within the reinforcement insulator means. Because of the constitution described above, in the joint structure for power cables according to the invention, there are electrostatic capacities between a plurality of electrode spherical bodies disposed in the said reinforcement insulator. Thus, electrostatic capacities are distributed in radial and axial directions of the cable conductor. As a result, the voltage in between the said cable conductor and the said cable shielding layer is borne. Further, the electrodes are formed as spherical bodies without angles, so that a steep electric field is not produced. In addition, deformation almost never occurs in molding there.

Moreover, the intervals of electrodes can be very narrow, so that the high voltage stress in the vicinity of the cable shielding layer can be easily dealt with. By means of the arrangement of electrode spheres, design of the proper electrostatic capacities in the whole joint section is then possible. In the termination joint section in particular, the linear distance from the cable shielding layer to the exposed cable conductor portion may be short, thus enabling the joint section to be compact.

DETAILED DESCRIPTION OF THE PREFERRED EMBODIMENTS

An embodiment of the invention will be described with reference to the accompanying drawings.

Figure 1:
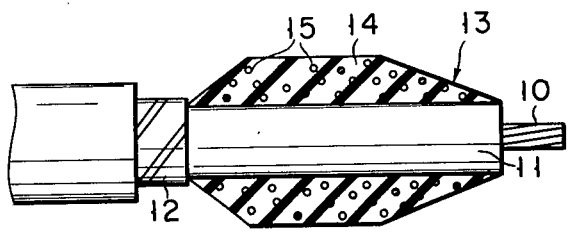
FIG. 1 is a view of the joint structure in termination of a power cable, illustrating the reinforcement insulator in section as an embodiment of the invention.

As illustrated in FIG. 1, in the joint structure in termination of a power cable as an embodiment of the invention, a cable insulator 11 is exposed with the tip portion of said cable conductor 10 also being exposed. At a specific distance from the exposed portion of the said cable conductor in an axial direction, that is, at a specific line distance, a cable shielding layer 12 remains on the said cable insulator 11 by stripping a cable sheath. In the section corresponding to the said line distance, a reinforcement insulator 13 is mounted on the said cable insulator 11. In the said reinforcement 13, a plurality of electrode spheres 15 are embedded in the insulator 14 made of a plastic such as ethylene-propylene rubber or crosslinked polyethylene. A conductive spherical body or a semiconductor spherical body is employed for each electrode sphere 15. In the case of conductive spherical bodies, a material such as steel, iron or aluminum is used. In the case of semiconductive spherical bodies, with a conductive sphere as the core, semiconductive layers of carbon and plastic are formed around the core. Alternatively, an insulating sphere of such as glass material is used for the said core. Diameters of these electrode spheres are about 0.5 mm to 10 mm. Disposition density of the plurality of spheres dispersion in the said insulator 14 can be freely set. The density close to the cable shielding layer may thus be greater than that of other portions, or the density in the middle portion of the reinforcement insulator may be made uniform.

Instead of increasing the disposition density, the diameter of electrode spheres may be increased and the interval of electrode spheres decreased in order to achieve the same effect.

Means of producing the said reinforcement insulator 13 will now be described.

Figure 2:
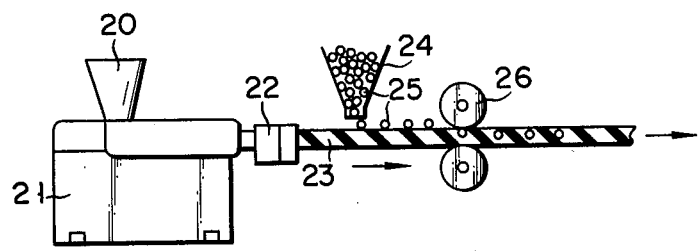
FIG. 2 is a side view of the process producing the reinforcement insulator as tape or sheet illustrated in FIG. 1.
Figure 3:
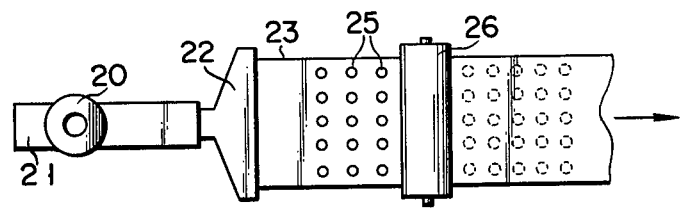
FIG. 3 is a plan view of FIG. 2.
Figure 4:
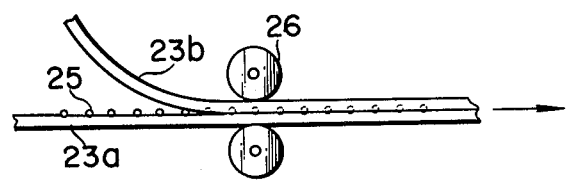
FIG. 4 is a view of an alternative process, for example, the production of a tape or sheet reinforcement insulator.

As apparent from the side view of the process in FIG. 2 and the plan view of the same in FIG. 3, insulating material contained in a hopper 20 is fed to an extruding machine 21 and thus extruded from a T die 22, so that a broad insulating sheet 23 is formed. Electrode spheres 25 are dropped onto this soft insulating sheet 23 just after extrusion for scattering thereon, as required from time to time, from an electrode spheres containment hopper 24. The said insulating sheet 23 is advanced at a specific speed in the forward arrow direction, and passed midway between rollers 26 so that the said electrode spheres scattered on the said sheet 23 are embedded in this insulating sheet 23. By winding the insulating sheet 23 thus formed around the cable insulator 11 illustrated in FIG. 1, the reinforcement insulator 13 is produced. In this case, the bonding strength between the said cable insulator 11 and the said reinforcement insulator 13 can be raised by heat molding, thereby providing an electrically strong joint structure. The insulating tape 23, as illustrated in FIG. 4, may be in sandwich structure by dispersion disposing the said electrode spheres 25 on one insulating sheet 23a and then superimposing the other insulating sheet 23b thereon.

Otherwise, by injection of, for example, molding ethylene-propylene rubber in which a plurality of electrode spheres have been embedded in advance, a unit of the same shape as the said reinforcement insulator 13 is produced. In this case, it is possible by use of two injection cylinders based on the double injection molding technique to have the two parts with respective higher and lower disposition densities of electrode spheres 25 in a single die.

Figure 5:
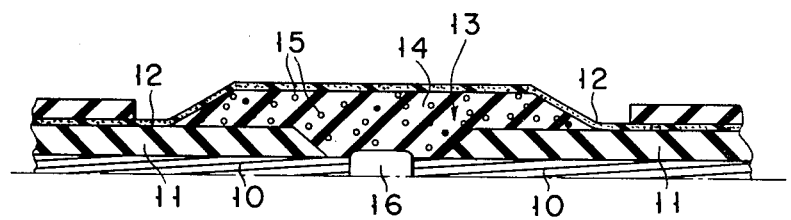
FIG. 5 is a view of the joint structure in an intermediate portion of a power cable, illustrating the essential part in section, as another embodiment of the invention.

In the embodiment described above the joint structure in termination of a power cable was described. As illustrated in FIG. 5, however, the invention is also applicable to the joint structure in an ihtermediate portion of a power cable.

In FIG. 5, two cable conductors 10, 10 are connected with a sleeve 16. The said cable conductors 10, 10 are covered with insulators 11, 11, with part of each cable conductor being exposed.

A reinforcement insulator 13 is formed in common with the exposed portions of the said cable connectors 10, 10, the said sleeve 16, and the said cable insulators 11, 11. The said reinforcement insulator 13 is formed with a plurality of electrode spheres 15 being embedded in the insulator 14. The said reinforcement insulator 13 is covered by a cable shielding layer 12. This cable shielding layer 12 also covers the said cable insulators 11, in extending thereto. Also in this joint structure in an intermediate portion of a power cable, the voltage in between the said cable conductors 10, 10 and the said cable shielding layer 12 is borne by the distribution of electrostatic capacities formed among the electrode spheres 15 dispersion disposed in the said reinforcement insulator 13.

Figure 6:
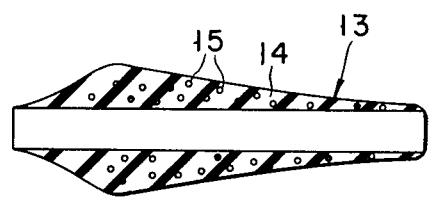
FIG. 6 is a sectional view of a rubber stress cone formed as the reinforcement insulator illustrated in FIG. 1.
Figure 7:
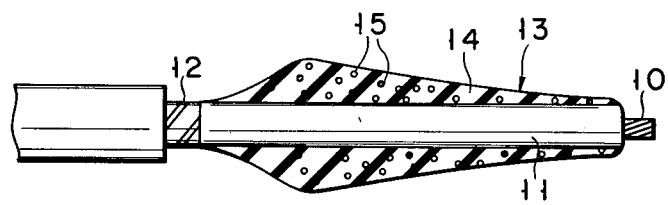
FIG. 7 is a view of the joint structure using the reinforcement insulator illustrated in FIG. 6, in termination of a power cable.

Referring to FIGS. 6 and 7, the joint structure in termination of a power cable as another embodiment of the invention will be described.

FIG. 6 illustrates a rubber stress cone formed as the said reinforcement insulator 13. The said rubber stress cone is formed by, for example, expandable ethylene-propylene rubber and is expandable in radial directions. In the interior, a plurality of electrode spheres 15 are dispersion disposed. The rubber stress cone is produced in advance in the factory. As illustrated in FIG. 7, the stress cone is mounted on the said cable insulator 11. When the termination portion of a power cable is to bear high voltage, for example, in the case of an especially high voltage of 66 KV or more, the said stress cone may be enclosed in a porcelain tube (not shown) and an insulating gas, SF$_6$, for example, may be filled into the tube followed by pressurization.

Figure 8:
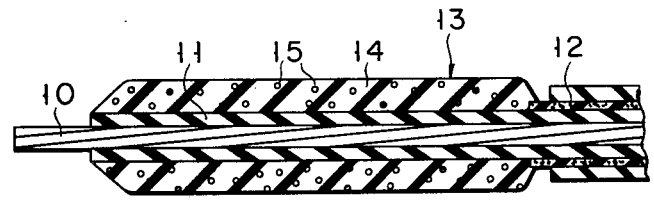
FIG. 8 is a view of the joint structure using a heat shrinking tube formed as the reinforcement insulator illustrated in FIG. 1, in termination of a power cable.
Figure 9:
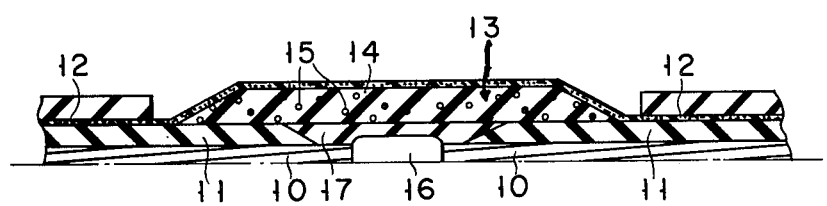
FIG. 9 is a view of the joint structure using a heat shrinking tube formed as the reinforcement insulator illustrated in FIG. 1, in an intermediate portion of a power cable.

Referring to FIGS. 8 and 9, the said reinforcement insulator 13 formed by shrinking a heat shrinking tube will now be described as another embodiment of the invention.

FIG. 8 illustrates the joint structure in termination of a power cable. For the reinforcement insulator 13, a heat shrinking tube is formed by extruding cross-linked polyethylene, cross-linked ethylene-propylene rubber or cross-linked silicone rubber, for example, as material of the heat shrinking tube from an extruding machine while dispersion disposing electrode spheres 25 therein. The heat shrinking tube thus formed is mounted on the cable insulator 11 covering the said cable conductor 10.

The said heat shrinking tube can also be formed by winding heat shrinking tape in which the said electrode spheres 25 are dispersion disposed in advance around the said cable insulator 11, followed by molding. The heat shrinking tube mounted as described above is shrunk by heating with hot air or an electric heater. FIG. 9 illustrates the joint structure in an intermediate portion of a power cable, using a heat shrinking tube, as an embodiment of the invention. The cable conductors 10, 10 with part of each conductor being exposed are connected with a sleeve 16. The said reinforcement insulator 13 covers the sleeve 16 and the exposed portions of the said cable conductors 10, 10 through an insulating spacer 17. This reinforcement insulator 13 also covers part of the cable insulators 11, 11 covering the said cable conductors 10, 10 by extending thereto. A cable shielding layer 12 then covers the said reinforcement insulator 13 and the said cable insulators 11, 11. In this joint structure also, the voltage in between the said cable conductors 10, 10 and the said cable shielding layer 12 is borne by the distribution of electrostatic capacities formed among the electrode spheres 15 dispersion disposed in the said reinforcement insulator 13.

Referring to FIGS. 10 through 14, the said reinforcement insulator formed by winding insulating braid in which a plurality of electrode spheres are disposed around a cable insulator 11 covering a cable conductor will be described as an embodiment of the invention.

Figure 10:
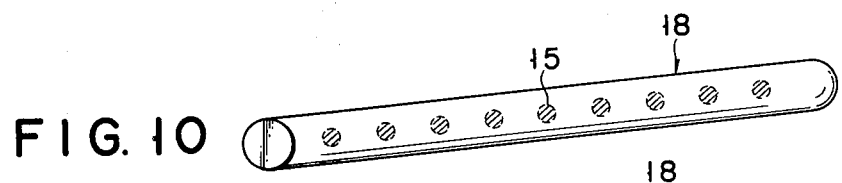
FIGS. 10, 11 and 12 are views of the braids, circular, square and triangular in section respectively, to be wound around a cable conductor through a cable insulator for forming the reinforcement insulator illustrated in FIG. 1, plural electrode spheres being disposed by dispersion therein.

In FIG. 10, electrode spheres 15 of a diameter of about 2 mm are embedded at about equal intervals in an insulating braid 18 circular in section. The insulating material used in the said insulating braid 18 is a rubber or plastic, such as polyethylene or cross-linked polyethylene. The diameter of the said insulating braid 18 varies according to the diameter of the electrode spheres 15 embedded therein, but the diameter may be such as to entirely embed the electrode spheres 15. Furthermore, the interval between the electrode spherical bodies 15 may be about the diameter of electrode spheres 15.

Figure 11:
Figure 12:

The sectional form of the said insulating braid 18 is not restricted to being circular. As illustrated in FIG. 11, it may be square, or as illustrated in FIG. 12, it may be triangular.

Figure 13:
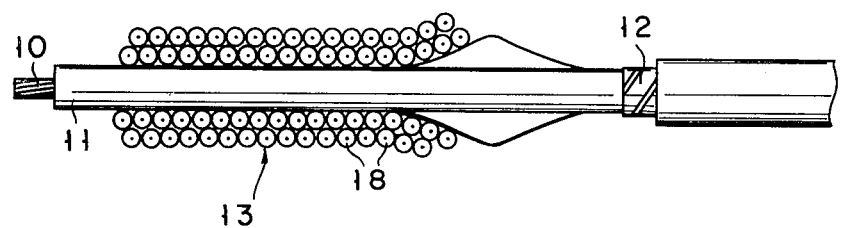
FIG. 13 is a view of the joint structure using a reinforcement insulator formed by winding the braid illustrated in FIG. 10 around a cable conductor through a cable insulator, in termination of a power cable.

The said insulating braid 18, for example, an insulating braid circular in section as illustrated in FIG. 13, is wound around a cable insulator 11 covering the said cable conductor 10 and then molded, so that a reinforcement insulator 13 is formed. In this embodiment of the invention, the voltage in between the said cable conductor 10 and the said shielding layer 12 is borne by the distribution of electrostatic capacities governed by the disposition of electrode spheres 15 in the said insulating braid 18.

Figure 14:
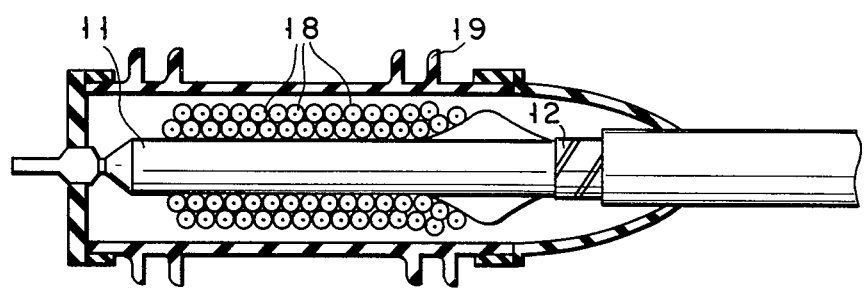
FIG. 14 is a view of the structure using the joint structure illustrated in FIG. 13 especially for high voltage, in termination of a power cable.

When the voltage in termination of a power cable is on the level of 6 to 22 KV, the joint structure illustrated in FIG. 13 is sufficient. However, in the case of a high voltage of 66 KV or more, it is effective, as illustrated in FIG. 14, to enclose the joint structure illustrated in FIG. 13 in a porcelain tube 19 and fill the interior with an insulating gas, $SF_6$ for example, followed by pressurization.

In the embodiments of the invention described above, the joint structure for bearing the voltage in between a cable conductor and a cable shielding layer was described. Next, referring to FIGS. 15, 16 and 17, the joint structure in which the electrical separation portion of the cable shielding layer 12a, 12a is improved will be described as an embodiment of the invention. This joint structure bears the induced voltage normally applied and also abnormal surge voltage in the electrical separation portion for the respective phases in the three-phase circuit employing the cross-bonding method.

Figure 15:
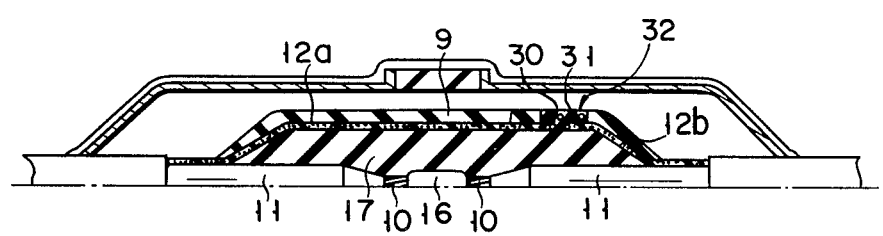
FIG. 15 is a sectional view of the joint structure of a power cable in which the voltage is distributed in the electrical separation portion for the cable shielding layer of each phase of the three-phase circuit under the control of an insulator layer into which electrodes are embedded.
Figure 16:
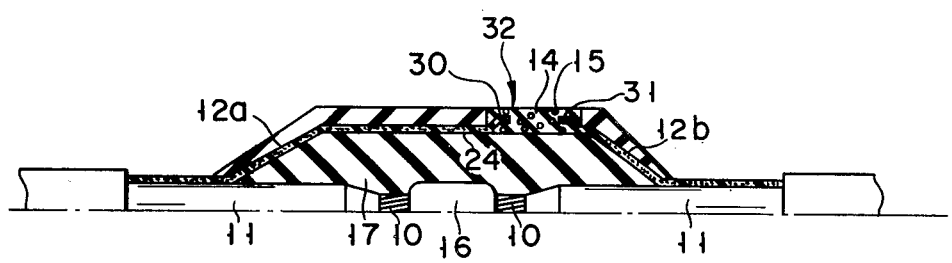
FIG. 16 is an enlarged sectional view of the said electrical separation portion illustrated in FIG. 15, in a sectional view of the essential part of the joint structure.
Figure 17:
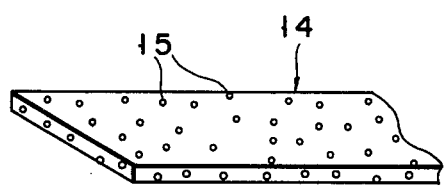
FIG. 17 is a perspective view of one part of the tape insulator used for forming the electrical separation portion illustrated in FIG. 16.

As illustrated in FIG. 15, an insulator 17 covers the cable insulators 11, 11 covering respectively the cable conductors 10, 10 connected with a sleeve 16, in common to the said sleeve 16 and the exposed portions of the said cable conductors. Cable shielding layers 12a and 12b then cover the said insulator 17, and the electrodes 30 and 31 are set at tips of the two shielding layers respectively. The portion formed between the layer electrodes 30 and 31 of the cable shielding layers is called an electrical separation portion 32. A reinforcement insulator 9 is set around the said cable shielding layers 12a, 12b including the electrical separation portion 32. FIG. 16 illustrates the said electrical separation portion 32 in enlarged form. In the gap between the electrode 30 at tip of the said cable shielding layer 12a and the electrode 31 at the tip of the other cable shielding layer is inserted an electrical separation insulator 14 in which a plurality of electrode spheres are dispersion disposed, thereby forming the said electrical separation portion 32. A sheet of plastic such as ethylene-propylene rubber or cross-linked polyethylene for the said electrical separation insulator 14 illustrated in FIG. 17 is used. For the said electrode spheres 15, a conductive spherical body or a semiconductor spherical body similar to those described with the embodiment in FIG. 1 is used. In this construction, when normally induced voltage and also surge abnormal voltage are applied in between the electrode 31 and the electrode 30 in the said electrical separation portion 32, these voltages are borne by the electrostatic capacities among the said electrode spheres 15.

What we claim is:

1. A power cable joint structure comprising:
   conductor means;
   cable insulator covering the conductor means;
   cable shielding layer wound about the cable insulator; and
   reinforcement insulator means covering an exposed portion of the cable insulator for controlling the voltage distribution between the conductor means and the cable shielding layer, said reinforcement insulator means containing electrode spherical bodies.

2. A power cable joint structure according to claim 1, wherein said reinforcement insulator means covers an exposed portion of the cable insulator from which one end portion of said conductor means protrudes, and said conductor means, cable insulator, cable shielding layer and reinforcement insulator means form a termination section.

3. A power cable joint structure according to claim 1, wherein said reinforcement insulator means covers an exposed portion of said conductor means and said cable insulator, said conductor means consists of two conductors which are connected together by a sleeve and covered by said reinforcement insulator means, and said conductor means, sleeve, cable insulator, cable shielding layer and reinforcement insulator means form an intermediate joint section.

* * * * *